W. Heston,
Horse Power.
N° 35,060. Patented Apr. 22, 1862.
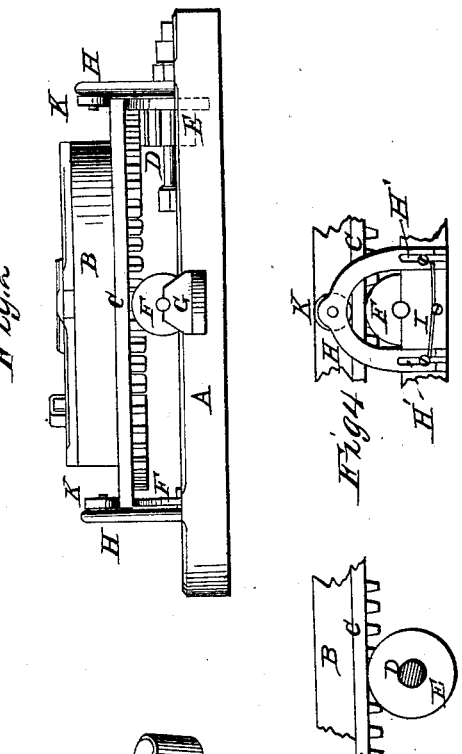
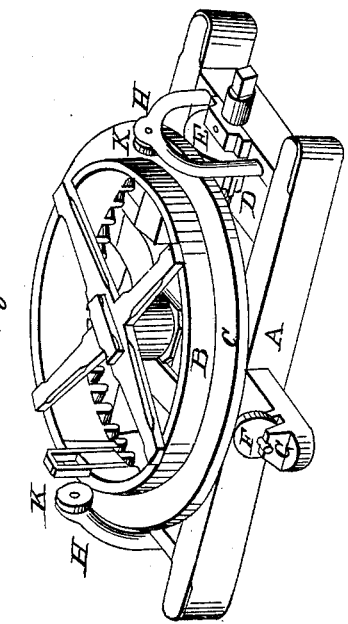
Witnesses.
Inventor
W. Heston

UNITED STATES PATENT OFFICE.

WILLIAM HESTON, OF BEDFORD, OHIO, ASSIGNOR TO ALDEN H. COMSTOCK, OF SAME PLACE.

HORSE-POWER.

Specification of Letters Patent No. 35,060, dated April 22, 1862.

*To all whom it may concern:*

Be it known that I, WILLIAM HESTON, of Bedford, in the county of Cuyahoga and State of Ohio, have invented new and useful Improvements in Horse-Powers; and I do hereby declare that the following is a full and complete description of the construction and operation of the same, reference being had to the accompanying drawings, making part of this specification, in which—

Figure 1, is a perspective view, Fig. 2 is a side view, and Figs. 3 and 4, are sections.

Like letters refer to like parts in the several views.

The nature of my invention relates to the construction of a pinion with a flange, forming a friction wheel and pinion combined; also, to adjustable standards for the support of friction rollers placed above the flange of the crown wheel, there being four friction wheels which support the rim of the crown wheel, and two adjustable friction rollers which prevent it from rising; the adjustable standards above named, being secured by slots and springs, to the frame of the crown wheel, as hereinafter described.

A, is the frame which supports the crown wheel, and other parts of the machinery, constituting the horse power. It is a rectangular frame, having a cross piece in the middle for the support of the main shaft of the crown wheel.

B, is the crownwheel, which is provided with a rim C—outside of the cogs, which rim is secured between friction wheels and rollers, as hereinafter described, to keep it steady and in place.

D, represents the pinion, which receives motion from the revolution of the crown wheel, and E is the flange which rises above the cogs, and thereby forming the friction wheel and pinion combined. There are three other friction wheels F, placed at the distance of a quarter circle from each other, under the rim of the crown wheel, and which, in part, in connection with the combined pinion and friction wheel, support the weight of the crown wheel, the wheels F resting upon bearings G upon the frame A.

H, H, are adjustable standards, which are provided with a slot H' in each leg, through which passes a bolt, thus allowing the standard, a vertical motion.

I represents springs that operate to press the adjustable standards H downward thus allowing a slight vertical motion.

K, is a friction roller, placed at the apex of each of these standards, and which rests upon the upper side of the rim C, of the crown wheel, one of them being over the flange E, of the pinion D, and the other exactly opposite. These friction rollers K, serve to keep the crown wheel from rising, or working upward when in motion; and any sudden strain in starting, or any sudden pull of the team, will not wrench and strain the crown wheel, for the adjustable standards H, yield a little, by means of the elasticity of the springs I; but these press downward with sufficient force, to keep the wheel from getting out of gear.

A horse power constructed in this way, is much more durable, less liable to get out of repair, and of easier draft, than those without friction wheels and adjustable rollers, as herein described.

I do not claim placing friction rollers either above or below the flange of the crown wheel for the purpose of its support when in motion neither do I claim placing a bearing flange upon the pinion wheel. But What I do claim as new, and for which I desire to obtain Letters Patent, is—

The self-adjustable standards H and springs I, in combination with the rollers K, when these several parts are arranged in their relation to the crown wheel B and pinion D, as and for the purpose specified.

W. HESTON.

Witnesses:
   L. TARBELL,
   LINN P. TARBELL.